(12) United States Patent
Kahn et al.

(10) Patent No.: US 11,778,693 B2
(45) Date of Patent: Oct. 3, 2023

(54) SUPPORT OF PROTOCOL DATA UNIT SESSION TYPES IN THE NETWORK

(71) Applicant: NOKIA TECHNOLOGIES OY, Espoo (FI)

(72) Inventors: Colin Kahn, Morris Plains, NJ (US); Thomas Theimer, Baierbrunn (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/965,553

(22) PCT Filed: Jan. 30, 2018

(86) PCT No.: PCT/US2018/015975
§ 371 (c)(1),
(2) Date: Jul. 28, 2020

(87) PCT Pub. No.: WO2019/151991
PCT Pub. Date: Aug. 8, 2019

(65) Prior Publication Data
US 2021/0051761 A1 Feb. 18, 2021

(51) Int. Cl.
*H04W 76/12* (2018.01)
*H04W 80/10* (2009.01)
*H04W 36/00* (2009.01)

(52) U.S. Cl.
CPC ........ *H04W 80/10* (2013.01); *H04W 36/0011* (2013.01); *H04W 76/12* (2018.02)

(58) Field of Classification Search
CPC . H04W 80/10; H04W 76/12; H04W 36/0011; H04W 36/12; H04L 61/6022; H04L 61/6013; H04L 61/103
See application file for complete search history.

(56) References Cited

U.S. PATENT DOCUMENTS

| | | | |
|---|---|---|---|
| 2003/0185233 A1* | 10/2003 | Ji | H04L 61/10 370/466 |
| 2014/0059192 A1* | 2/2014 | Miklos | H04W 8/26 709/221 |

(Continued)

FOREIGN PATENT DOCUMENTS

| | | | | |
|---|---|---|---|---|
| EP | 1 151 581 B1 | 3/2008 | | |
| WO | WO 2000-549192 | * | 2/1999 | ............ H04L 12/28 |

OTHER PUBLICATIONS

3GPP259 (Samsung: "23.502: Update of PDU session anchor relocation for SSC mode 2", S2-173259, May 2017).*

(Continued)

*Primary Examiner* — Lakeram Jangbahadur
(74) *Attorney, Agent, or Firm* — SQUIRE PATTON BOGGS (US) LLP (57) ABSTRACT

Various communication systems may benefit from improved network communication setup. A method, in certain embodiments, may include determining at a network entity a new protocol data unit session anchor of a protocol data unit session with a user equipment. The method may also include transmitting from the network entity to the new protocol data unit session anchor a request to establish the new protocol data unit session anchor. In addition, the method may include transmitting an indication from the network entity to a radio access network. The indication may notify the radio access network to switch paths to the new protocol data unit session anchor. Further, the method includes sending from the network entity a gratuitous address resolution protocol request to the determined new packet data unit session anchor. The gratuitous address resolution protocol request may comprise an address of the user equipment in the protocol data unit session.

20 Claims, 6 Drawing Sheets

(56) References Cited

U.S. PATENT DOCUMENTS

| | | | | |
|---|---|---|---|---|
| 2016/0373357 | A1* | 12/2016 | Keesara | H04L 49/70 |
| 2019/0110214 | A1* | 4/2019 | Shen | H04W 40/24 |
| 2020/0186490 | A1* | 6/2020 | Bhaskaran | H04L 61/5014 |
| 2021/0211960 | A1* | 7/2021 | Ryu | H04W 36/14 |

OTHER PUBLICATIONS

3GPP022 (Huawei et al: "Solving paging storm issue on ARP broadcast in Ethernet POU sessions (TS 23.501)", 3GPP Draft; S2-178022, Oct. 2017).*

International Search Report and Written Opinion dated Oct. 8, 2018 corresponding to International Patent Application No. PCT/US2018/015975.

Samsung: "23.502: Update of PDU session anchor relocation for SSC mode 2," 3GPP Draft; S2-173259_SSC2 Relocation Update, vol. SA WG2, Hangzhou; May 9, 2017 XP051268714.

Huawei et al: "Solving paging storm issue on ARP broadcast in Ethernet PDU sessions (TS 23.501)," 3GPP Draft; S2-178022-PCR-23501-Paging-Storm-on-ARP-Broadcast-Ethernet-PDU, vol. SA WG2, Ljubljana, Slovenia, Oct. 30, 2017, XP051360639.

PCT International Preliminary Report on Patentability dated Apr. 6, 2020 corresponding to International Patent Application No. PCT/US2018/015975.

Written Opinion of the International Preliminary Examining Authority dated Jan. 10, 2020 corresponding to International Patent Application No. PCT/US2018/015975.

3GPP TS 23.501 V15.0.0 (Dec. 2017), Technical Specification, 3rd Generation Partnership Project; Technical Specification Group Services and System Aspects; System Architecture for the 5G System; Stage 2 (Release 15), Dec. 2017.

3GPP TS 23.502 V15.0.0 (Dec. 2017), Technical Specification, 3rd Generation Partnership Project; Technical Specification Group Services and System Aspects; Procedures for the 5G System; Stage 2 (Release 15), Dec. 2017.

3GPP TS 23.003 V14.6.0 (Dec. 2017), Technical Specification, 3rd Generation Partnership Project; Technical Specification Group Core Network and Terminals; Numbering, addressing and identification (Release 14), Dec. 2017.

* cited by examiner

SUPPORT OF PROTOCOL DATA UNIT SESSION TYPES IN THE NETWORK

BACKGROUND

Field

Various communication systems may benefit from improved network communication setup. For example, certain embodiments may benefit from an improved switching of a protocol data unit session anchor.

Description of the Related Art

One of the purposes of Third Generation Partnership Project (3GPP) networks is to provide connectivity between a user equipment (UE) and a packet data network (PDN). In $4^{th}$ generation (4G) 3GPP technology, for example, a PDN connection is used to provide an association between a user equipment, represented by one internet protocol version 4 (IPv4) address and/or one internet protocol version 6 (IPv6) prefix, and a PDN represented by an Access Point Name (APN). The APN is described using a network identifier (APN-NI) identifying the data network, a mobile network code (MNC) identifying the operator and a mobile country code (MCC) identifying the country.

In $5^{th}$ generation (5G) 3GPP technology, PDN connections are replaced by protocol data unit (PDU) sessions. In addition to providing IPv4 and IPv6 PDU Sessions, 5G offers PDU Sessions for other PDU types, such as Ethernet and Unstructured Data PDUs. This allows 5G technology to transport Ethernet or Unstructured Data packets, thereby directly providing connectivity to an Ethernet network. For 4G PDN connections and 5G IPv4 or IPv6 sessions, internet protocol (IP) addresses are allocated according to network topology. If the PDU session anchor changes, a new IP address corresponding to a subnet/prefix of a new user plane function (UPF), or a packet gateway (PGW) in 4G, is usually assigned to the user equipment. This allows the packets sent from the PDN to be routed or tunneled to the new UPF serving the user equipment.

SUMMARY

According to certain embodiments, an apparatus may include at least one memory including computer program code, and at least one processor. The at least one memory and the computer program code may be configured, with the at least one processor, to cause the apparatus at least to determine a new protocol data unit session anchor of a protocol data unit session with a user equipment. The at least one memory and the computer program code may also be configured, with the at least one processor, to cause the apparatus at least to transmit to the new protocol data unit session anchor a request to establish the new protocol data unit session anchor. In addition, the at least one memory and the computer program code may be configured, with the at least one processor, to cause the apparatus at least to transmit an indication to a radio access network. The indication may notify the radio access network to switch paths to the new protocol data unit session anchor. Further, the at least one memory and the computer program code may be configured, with the at least one processor, to cause the apparatus at least to send a gratuitous address resolution protocol request to the determined new packet data unit session anchor after the transmitting of the request and the indication. The gratuitous address resolution protocol request may comprise an address of the user equipment in the protocol data unit session.

A method, in certain embodiments, may include determining at a network entity a new protocol data unit session anchor of a protocol data unit session with a user equipment. The method may also include transmitting from the network entity to the new protocol data unit session anchor a request to establish the new protocol data unit session anchor. In addition, the method may include transmitting an indication from the network entity to a radio access network. The indication may notify the radio access network to switch paths to the new protocol data unit session anchor. Further, the method includes sending from the network entity a gratuitous address resolution protocol request to the determined new packet data unit session anchor after the transmitting of the request and the indication. The gratuitous address resolution protocol request may comprise an address of the user equipment in the protocol data unit session.

An apparatus, in certain embodiments, may include means for determining at a network entity a new protocol data unit session anchor of a protocol data unit session with a user equipment. The apparatus may also include means for transmitting from the network entity to the new protocol data unit session anchor a request to establish the new protocol data unit session anchor. In addition, the apparatus may include means for transmitting an indication from the network entity to a radio access network. The indication may notify the radio access network to switch paths to the new protocol data unit session anchor. Further, the apparatus may include means for sending from the network entity a gratuitous address resolution protocol request to the determined new packet data unit session anchor after the transmitting of the request and the indication. The gratuitous address resolution protocol request may comprise an address of the user equipment in the protocol data unit session.

According to certain embodiments, a non-transitory computer-readable medium encoding instructions that, when executed in hardware, perform a process. The process may include determining at a network entity a new protocol data unit session anchor of a protocol data unit session with a user equipment. The process may also include transmitting from the network entity to the new protocol data unit session anchor a request to establish the new protocol data unit session anchor. In addition, the process may include transmitting an indication from the network entity to a radio access network. The indication may notify the radio access network to switch paths to the new protocol data unit session anchor. Further, the process may include sending from the network entity a gratuitous address resolution protocol request to the determined new packet data unit session anchor after the transmitting of the request and the indication. The gratuitous address resolution protocol request may comprise an address of the user equipment in the protocol data unit session.

According to certain other embodiments, a computer program product may encode instructions for performing a process. The process may include determining at a network entity a new protocol data unit session anchor of a protocol data unit session with a user equipment. The process may also include transmitting from the network entity to the new protocol data unit session anchor a request to establish the new protocol data unit session anchor. In addition, the process may include transmitting an indication from the network entity to a radio access network. The indication may notify the radio access network to switch paths to the new protocol data unit session anchor. Further, the process may include sending from the network entity a gratuitous address resolution protocol request to the determined new packet data unit session anchor after the transmitting of the request and the indication. The gratuitous address resolution protocol request may comprise an address of the user equipment in the protocol data unit session.

According to certain embodiments, an apparatus may include at least one memory including computer program code, and at least one processor. The at least one memory and the computer program code may be configured, with the at least one processor, to cause the apparatus at least to receive a gratuitous address resolution protocol request from a network entity. The apparatus may be a new protocol data unit session anchor of a protocol data unit session with a user equipment. The gratuitous address resolution protocol request may comprise an address of the user equipment. The at least one memory and the computer program code may also be configured, with the at least one processor, to cause the apparatus at least to transmit a gratuitous address resolution protocol announcing to a data network of the new protocol data unit session anchor. In addition, the at least one memory and the computer program code may also be configured, with the at least one processor, to cause the apparatus at least to receive at least one of uplink data at the new protocol data unit session anchor from the user equipment or downlink data via the data network.

A method, in certain embodiments, may include receiving at a new protocol data unit session anchor of a protocol data unit session with a user equipment a gratuitous address resolution protocol request from a network entity. The gratuitous address resolution protocol request may comprise an address of the user equipment. The method may also include transmitting from the new protocol data unit session anchor a gratuitous address resolution protocol announcing to a data network of the new protocol data unit session anchor. In addition, the method may include receiving at least one of uplink data at the new protocol data unit session anchor from the user equipment or downlink data via the data network.

An apparatus, in certain embodiments, may include means for receiving at a new protocol data unit session anchor of a protocol data unit session with a user equipment a gratuitous address resolution protocol request from a network entity. The gratuitous address resolution protocol request may comprise an address of the user equipment. The apparatus may also include means for transmitting from the new protocol data unit session anchor a gratuitous address resolution protocol announcing to a data network of the new protocol data unit session anchor. In addition, the apparatus may include means for receiving at least one of uplink data at the new protocol data unit session anchor from the user equipment or downlink data via the data network.

According to certain embodiments, a non-transitory computer-readable medium encoding instructions that, when executed in hardware, perform a process. The process may include receiving at a new protocol data unit session anchor of a protocol data unit session with a user equipment a gratuitous address resolution protocol request from a network entity. The gratuitous address resolution protocol request may comprise an address of the user equipment. The process may also include transmitting from the new protocol data unit session anchor a gratuitous address resolution protocol announcing to a data network of the new protocol data unit session anchor. In addition, the process may include receiving at least one of uplink data at the new protocol data unit session anchor from the user equipment or downlink data via the data network.

According to certain other embodiments, a computer program product may encode instructions for performing a process. The process may include receiving at a new protocol data unit session anchor of a protocol data unit session with a user equipment a gratuitous address resolution protocol request from a network entity. The gratuitous address resolution protocol request may comprise an address of the user equipment. The process may also include transmitting from the new protocol data unit session anchor a gratuitous address resolution protocol announcing to a data network of the new protocol data unit session anchor. In addition, the process may include receiving at least one of uplink data at the new protocol data unit session anchor from the user equipment or downlink data via the data network.

BRIEF DESCRIPTION OF THE DRAWINGS

For proper understanding of the invention, reference should be made to the accompanying drawings, wherein.

DETAILED DESCRIPTION

In 3GPP New Radio (NR) technology, a user plane (UP) of a PDU session terminates at a PDU session anchor, such as a UPF, located in the Next Generation Core (NGC). The UPF, in certain embodiments, may be used as a PDU session anchor, and may be selected by a session management function (SMF) when the PDU session is setup and/or when service is requested for a user equipment (UE). The SMF may select the initial UPF assigned for a PDU session, and if needed may reselect a new UPF.

An SMF may select a new UPF, for example, when the user equipment has moved to a location where a new UPF is closer to the user equipment. The data path may therefore be shortened by reselection, potentially improving latency and throughput. In another example, the selection of a new UPF by the SMF may be caused by the SMF wanting to offload data from the network at a local UPF, or offload data when local content and/or services are available through a new UPF. In yet another example, the SMF may select a new UPF when there is greater congestion at the current UPF than at the new UPF, and/or when security or jurisdictional considerations make a new UPF preferred or required.

When the PDU session anchor changes, for IP type PDU Sessions, a new IP address corresponding to the subnet or prefix of the new UPF in 5G or the PGW in 4G is transmitted to the user equipment. For Ethernet PDU sessions, however, neither a medium access control (MAC) nor an IP address need be allocated to the user equipment by the NGC.

3GPP has defined three Session and Service Continuity (SSC) modes in section 5.6.9.2 of TS 23.501. 3GPP TS 23.501 is hereby incorporated by reference. With SSC mode 1, the PDU session anchor may not change, and IPv4 or IPv6 addresses are preserved as the UE moves about the service area. With SSC mode 2, the network instructs the UE to release the PDU session anchor and immediately request the establishment of a new PDU session anchor in the same data network. Upon receiving a request to reestablish the PDU Session, the SMF may select a different PDU session anchor from the one previously assigned. For IPv4 or IPv6 PDU sessions, the network may release IP addresses that have been allocated to the user equipment, and may assign new addresses. In other words, SSC mode 2 allows the user equipment to support only a single PDU session anchor at a time for a PDU Session.

With SSC mode 3, a connection through the new PDU session anchor may be established before the previous connection to the old PDU session anchor is terminated. For IPv4 or IPv6 PDU sessions, the IP address may not be preserved, and a new address may be assigned corresponding to the new PDU session anchor. However, on-going transactions may be maintained on the old PDU session anchor for some time so they can be gracefully migrated or terminated. Certain embodiments described herein may be used along with SSC mode 2 and/or SSC mode 3.

In SSC modes 2 and 3, the PDU session anchor may be changed. According to 3GPP procedures, the changing of the PDU session anchor in SCC modes 2 and 3 involves signaling with the user equipment. Specifically, for IPv4 and/or IPv6 PDU sessions signaling with the user equipment is used to change the user equipment IP address at the new PDU session anchor.

Certain embodiments, as illustrated in FIGS. 1-5, help to provide efficient and reliable signaling for changing a PDU session anchor, such as an Ethernet or Unstructured Data PDU session types, which does not require any signaling between the network and the user equipment. Unstructured Data PDU sessions may be any session that does not use Internet protocol at the network layer or Ethernet at the MAC layer. For example, Unstructured Data PDU sessions may be used to transport service discovery PDUs, such as Bluetooth Service Discovery PDUs. The embodiments shown in FIGS. 1-5 may allow for the changing of the PDU session anchor without having to signal the user equipment before uplink and/or downlink data is transmitted between the user equipment and the new PDU session anchor. In some embodiments that involve Ethernet or some unstructured PDU sessions, signaling with the user equipment may not be required in order to change the PDU session anchor. The network, in such embodiments, may have no role in assigning the MAC addresses used by the user equipment or the unstructured data identifiers.

In other words, the PDU session anchor may be changed for Ethernet PDU sessions and/or for Unstructured Data sessions, in which user equipment identifiers are not associated with the selected PDU session anchor. Certain embodiments may help to eliminate signaling with the user equipment when changing the PDU session anchor, irrespective of some PDU session types. The PDU session type, for example, may be Ethernet or Unstructured Data.

Certain embodiments help to coordinate PDU session anchor changes by updating switch forwarding tables for user equipment MAC addresses associated with the PDU session. For example, the new PDU session anchor may update the tables via the transmitting of a gratuitous address resolution protocol (ARP). The old PDU session anchor, in some embodiments, may record the source user equipment MAC addresses of uplink packets, and may convey downlink packets with these MAC addresses to the new PDU session anchor during an anchor change. One or more forwarding tables may be set up in the old PDU session anchor, so that downlink packets associated with in-progress transactions can be forwarded to the new PDU session anchor. As can be seen in FIG. 2, in certain embodiments, an end marker may be sent from the old PDU session anchor to the radio access network (RAN) to indicate that no further downlink data will be sent on the old N3 tunnel, after the PDU session anchor relocation or change. The N3 tunnel may be a communications tunnel connecting the old PDU session anchor, such as UPF1 shown in FIGS. 1 and 2, and the RAN serving the UE.

Figure 1:
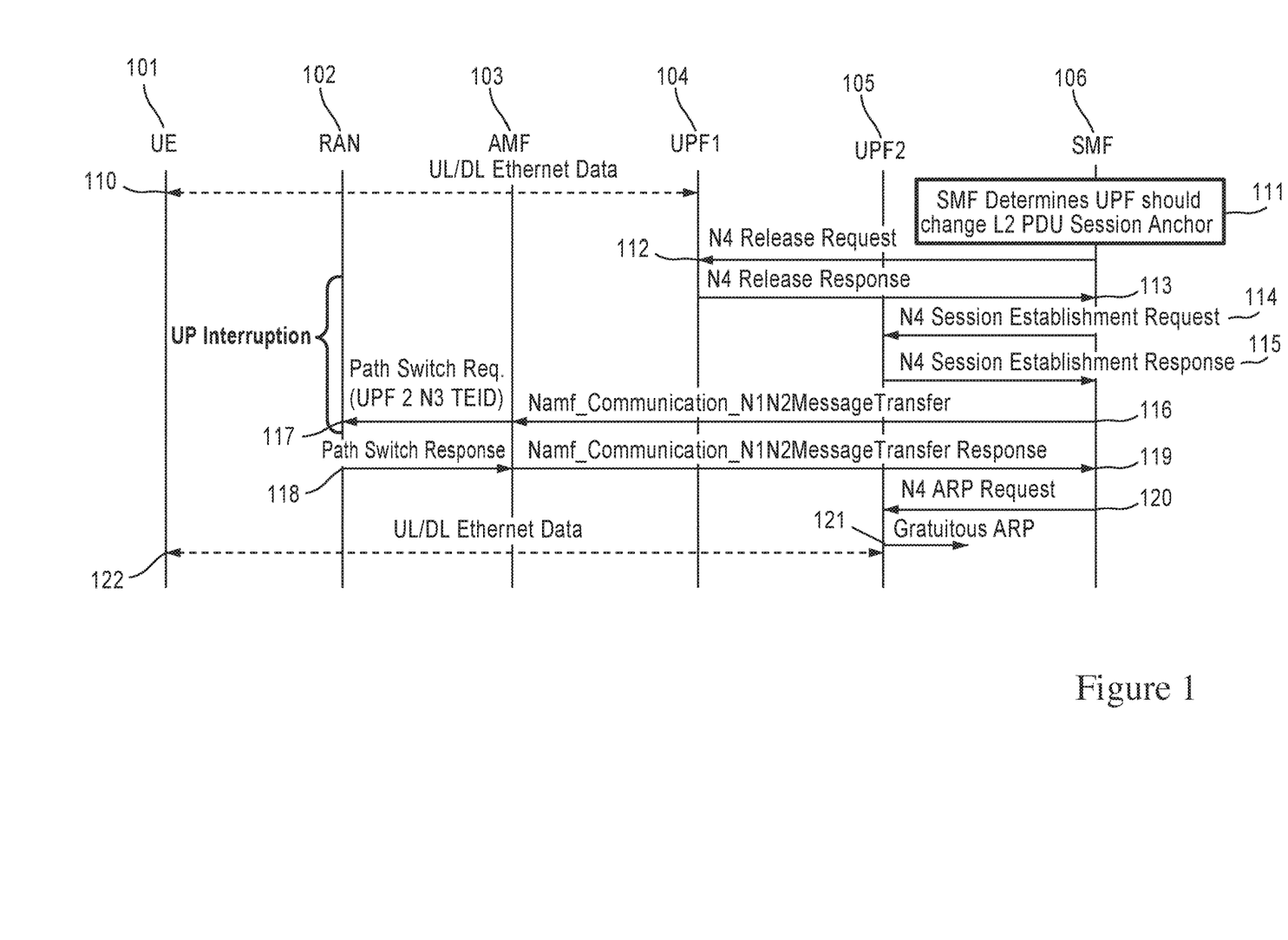
FIG. 1 illustrates an example of a signal flow diagram according to certain embodiments.
Figure 2:
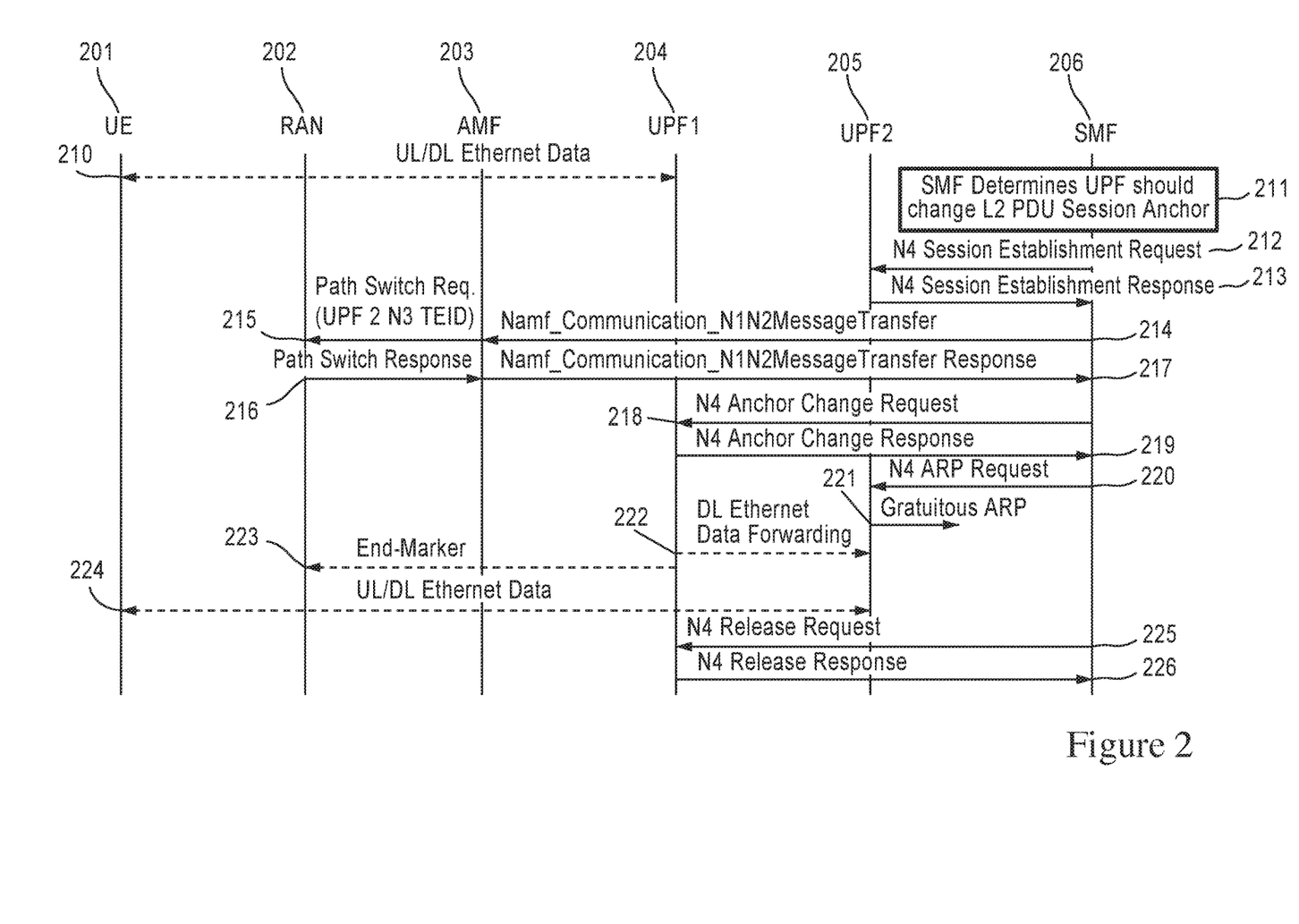
FIG. 2 illustrates an example of a signal flow diagram according to certain embodiments.

FIG. 1 illustrates an example of a signal flow diagram according to certain embodiments. In particular, FIG. 1 illustrates an embodiment in which an Ethernet PDU session anchor may be relocated or changed without involving user equipment 101. In other embodiments, a different data type other than Ethernet data, such as Unstructured Data may be used. The embodiment shown in FIG. 1 may be used along with, or may be compatible with, an SSC mode 2, in which an old PDU session anchor is released before a new PDU session anchor is established. In certain embodiments, the change to the PDU session anchor shown in FIG. 1 may result in a brief interruption in the user plane connectivity service.

In step 110, UE 101 may transmit uplink data and/or receive downlink data from a first UPF (UPF1) 104. UPF1 may be an example of an old PDU session anchor. In the embodiment of FIG. 1, the uplink and/or downlink data may be Ethernet data, and the PDU session may be an Ethernet PDU session. Transmissions between UE 101 and UPF1 104 may be transmitted via RAN 102. Transmissions between the UE 101 and Session Management Function (SMF) 106 may be transmitted via RAN 102 and access management function (AMF) 103. In step 111, a network entity, such as the SMF, may determine a new PDU session anchor for a PDU session with a user equipment. In other words, the SMF determines that UPF2 105, which may be an example of the new PDU session anchor, should be the new layer 2 (L2) PDU session anchor. As discussed above, the SMF may determine that a change may be needed because the new PDU session anchor may better serve the UE. For example, changing to a new PDU session anchor may increase the quality of experience or quality of service of the UE.

In step 112, SMF 106 transmits a release request, such as an N4 release request, to the old PDU session anchor, such as UPF1, before sending the gratuitous ARP request. N4 may be the interface used for transmitting communications between SMF 106 and UPF2 105. Transmitting the release request to UPF1, may release the old PDU session anchor, and interrupt the flow of uplink and/or downlink data. In step 113, UPF1 104 may transmit a release response to SMF 106. The release response may therefore be transmitted in response to the release request or the anchor change request. The release response, for example, may be an N4 release acknowledgment. The acknowledgment message may include stored UE MAC addresses from packets that traversed the released old PDU session anchor. In other words, the release response may include the address of the user equipment in the PDU session. The address may be a UE MAC address. In some embodiments, the address of the user equipment may be included in a switch forwarding table.

The network entity, for example SMF 106, may set up the new PDU session anchor in UPF2 105. In doing so, SMF 106 may transmit an N4 session establishment request to UPF2 105, as shown in step 114. The N4 establishment request may include at least one of the new PDU session anchor with the RAN N3 tunnel endpoint of the PDU session and/or the UE MAC identification received from the old PDU session anchor. While the downlink packets at UPF2 105 may be sent to the RAN, after step 114, switch forwarding tables in the data network may not yet be updated to allow for the transmission of uplink and/or downlink packets to UPF2 105. In step 115, UPF2 105 may transmit an N4 session establishment response to SMF 106 acknowledging that the N4 session has been established.

In step 116, SMF 106 may use the Namf_Communication_N1N2MessageTransfer service of AMF 103 to inform the RAN of the new PDU session anchor. 3GPP TS 23.502 provides additional detail about the Namf_Communication_N1N2MessageTransfer service. 3GPP TS 23.502 is hereby incorporated by reference. SMF 106 may transmit the message to AMF 103 in step 116, which may then forward a path switch request to RAN 102, in step 117. In steps 116 and 117, SMF 106 may provide RAN 102 with the N3 tunnel endpoint of UPF2 105. The N3 tunnel endpoint, for example, may be in the form of an IP address and/or a general packet radio service (GPRS) Tunneling Protocol (GTP) Tunnel Endpoint Identifier (TEID).

In step 118, RAN 102 may transmit a path switch response to AMF 103, and then transmits an Namf_Communication_N1N2MessageTransfer Response from AMF 103 to SMF 106, as shown in step 119. The RAN may then forward any received packets from UE 101 through the tunnel to the new PDU session anchor in UPF2 105. Responses to those packets may be sent back through UPF2 105, for example, via switch data plane learning.

In step 120, the network entity, such as SMF 106, may send a gratuitous ARP request, which may be in the form of an N4 message, to the determined new PDU session anchor, such as UPF2 105. The gratuitous ARP request may include an address of the user equipment in the PDU session. The gratuitous ARP request may therefore include the UE MAC addresses received from the old PDU session anchor, in step 113. The gratuitous ARP request may be an N4 message that includes a link layer ARP message. In another embodiment, the gratuitous ARP request may be an N4 message that simply includes one or more UE MAC addresses. In other words, the gratuitous ARP request may be an ARP packet where the source and destination IP are both set to the IP of the machine issuing the packet, such as SMF 106, and the destination MAC may be a broadcast address. The source MAC address of the gratuitous ARP may be the MAC address of the UE, and the ARP packet may update the switch forwarding tables such that the MAC address may be reachable via the new PDU session. In embodiments in which there may be multiple MAC addresses behind the same UE, then multiple packets may be sent. The MAC addresses may be the destination address of that packet.

The new PDU session anchor, such as UPF2 105, may then transmit a gratuitous ARP announcing to switches in the Data Network, the new PDU session anchor, as shown in step 121. The gratuitous ARP may be an implicit announcement. In certain embodiments, instead of the gratuitous ARP packet being generated at the SMF 106, the gratuitous ARP packet may be generated by the new PDU session anchor UPF2 105. In other words, in one embodiments SMF 106 may transmit the UE MAC address to UPF2 105, in the form of an N4 ARP request, and UPF2 105 may formulate or create the ARP packet and broadcast the packet to the data network, including the L2 switches in the data network. In yet another embodiment, SMF 106 may create the ARP packet and send the packet to UPF2 105. UPF2 105 may then transmit the received packet to the data network, including the L2 switches in the data network.

In step 121, the UPF2 105 may transmit a gratuitous ARP so that in the absence of an uplink packet from the user equipment, the data network switches will update their forwarding tables to allow for the forwarding of packets to the new PDU session anchor, such as UPF2 105, instead of the old PDU session anchor, such as UPF1 104. In step 122, UE 101 may transmit uplink Ethernet data to the new PDU session anchor, such as UPF2 105, and receive downlink Ethernet data from the new PDU session anchor. In other words, in step 122, the new PDU session anchor may receive uplink Ethernet data from UE 101, or transmit downlink Ethernet data to UE 101.

FIG. 2 illustrates an example of a signal flow according to certain embodiments. In particular, FIG. 2 illustrates an embodiment in which an Ethernet PDU session anchor may be relocated or changed without having to signal user equipment 201 before changing the PDU session anchor. The embodiment shown in FIG. 2 may be used along with, or may be compatible with, an SSC mode 3, in which a new PDU session anchor is established before the old PDU session anchor is removed. In certain embodiments, the connectivity service may not be interrupted during the changing of the PDU session anchor. The signal flow diagram shown in FIG. 2 includes UE 201, RAN 202, AMF 203, UPF1 204, UPF2 205, and SMF 206, which may be similar to UE 101, RAN 102, AMF 103, UPF1 104, UPF2 105, and SMF 106, respectively, shown in FIG. 1.

In step 210, UE 201 may transmit uplink data and/or receive downlink data from UPF1 204. In step 211, a network entity, such as SMF 206, may determine a new PDU session anchor, such as UPF2 205, for a PDU session with UE 201. As shown in FIG. 2, SMF 206 determines that the UPF should change an L2 PDU session anchor. In step 212, the network entity transmits a session establishment request, such as an N4 session establishment request, to the new PDU session anchor, for example UPF2 205. The N4 session establishment request may provide UPF2 205 with the RAN N3 tunnel endpoint of the PDU session. In step 213, the new PDU session anchor may send an N4 session establishment response to SMF 206.

As shown in steps 214 and 215, SMF 206 may then use Namf_Communication_N1N2MessageTransfer service to send a path switch request to RAN 202 via AMF 203. The path switch request, received by RAN 202 in step 215, may include the IP address and/or the GTP TEID of UPF2 205. In steps 216 and 217, RAN 202 sends an Namf_Communication_N1N2MessageTransfer Response to SMF 206 via AMF 203. Once the RAN has received the IP address and/or the GTP TEID of UPF2 205, RAN 202 may forward any received packets from UE 201 through the tunnel to the new PDU session anchor, such as UPF2 205. Responses to those received packets may be sent back through UPF2 205, for example, via a switch data plane learning.

In certain embodiments, as shown in step 218, a network entity, such as SMF 206, may send or transmit an N4 anchor change request to the old PDU session anchor, such as UPF1 204. The N4 anchor change request may identify the new PDU session anchor endpoint so that the old PDU session anchor may be able to forward packets to the new PDU session anchor. In step 219, the old PDU session anchor, such as UPF1 204, may respond to SMF 206 with an N4 anchor change response, such as an N4 anchor change acknowledgement. The acknowledgment may include one or more addresses of the user equipment in the PDU session. The addresses, for example, may be UE MAC addresses from packets that traversed the old PDU session anchor.

In step 220, the network entity, such as SMF 206, may send a gratuitous ARP request, such as an N4 ARP request, to the determined new PDU session anchor, such as UPF2 205. The gratuitous ARP request may comprise an address of the UE in the PDU session, such as the one or more UE MAC addresses received in step 219. In step 221, the new PDU session anchor transmits a gratuitous ARP announcing to switches in the Data Network, the new PDU session anchor. In other words, the gratuitous ARP may update the L2 switches. Layer 2 switches in a network may forward packets based on a forwarding table that maps destination MAC addresses to a specific switch port. In the absence of UL packets from the user equipment, the data network L2 switches may forward packets to the old PDU session anchor instead of the new PDU session if the gratuitous ARP is not sent. The gratuitous ARP may be either a broadcast signal or a unicast signal transmitted from the new PDU session anchor.

Upon receiving the gratuitous ARP, the old PDU session anchor, as shown in step 223, may send an end-marker to RAN 202, and forward downlink packets it has received to the new PDU session anchor, as shown in step 222. The end-marker may indicate that the RAN has received the last packet from the old PDU session anchor. In step 224, UE 201 may transmit uplink Ethernet data to the new PDU session anchor, such as UPF2 205, and receive downlink Ethernet data from the new PDU session anchor. Even after step 224, the old PDU session anchor may yet to be removed, even though the new PDU session anchor has been established. Having both the old PDU session anchor and the new PDU session anchor active at the same time may be characteristic of the SSC mode 3. In step 225, the old PDU session anchor may receive an N4 release request from SMF 206, and in step 226 the old PDU session anchor may transmit an N4 release response acknowledging that the old PDU session anchor has been released.

Figure 3:
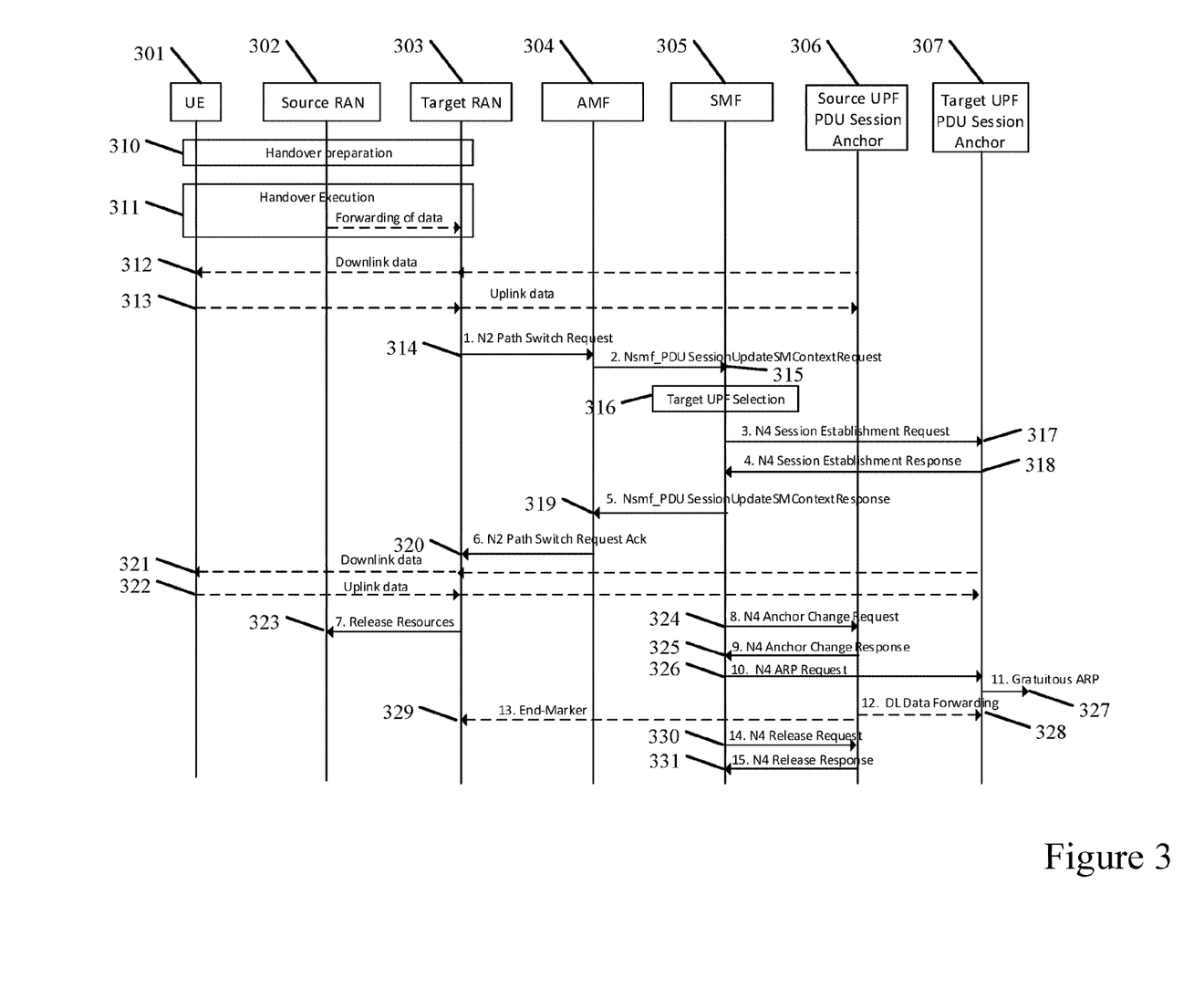
FIG. 3 illustrates an example of a signal flow diagram according to certain embodiments.

FIG. 3 illustrates an example of a signal flow diagram according to certain embodiments. In particular, FIG. 3 illustrates an embodiment in which a mobility event, such as a handover, may be the reason for a PDU session anchor change or reselection. Similar to FIGS. 1 and 2, FIG. 3 illustrates the transmission of Ethernet data. However, the embodiments shown in FIGS. 1, 2, and 3 may be used with other types of PDU session or data type, such as Unstructured Data. FIG. 3 also illustrates that the new PDU session anchor may be setup before the old PDU session anchor is released, similar to the embodiment shown in FIG. 2. As such, in certain embodiments the user plane connectivity service is not interrupted and no packets are lost, similar to SSC mode 3.

In step 310, a handover preparation is undergone by UE 301, source RAN 302, and target RAN 303. The handover may be a handing over of UE 301 from source RAN 302 to target RAN 303. The handover is then executed in step 311, and source RAN 302 forwards data to target RAN 303. In step 312, an old PDU session anchor, such as source UPF 306, may transmit downlink data to UE 301, and receive uplink data from UE 301, as shown in step 313. In step 314, target RAN 303 may transmit an N2 path switch request to AMF 304, which may then forward an Nsmf_PDU Session Update SM Context Request to SMF 305, as shown in step 315. In step 316, a network function, such as an SMF 305, may determine a target UPF selection. In other words, SMF 305 may determine a new PDU session anchor of a PDU session with UE 301.

In step 317, an N4 session establishment request, may be transmitted from SMF 305 to a new PDU session anchor, such as target UPF 307. New PDU session anchor 307 may then transmit an N4 session establishment response to SMF 305, as shown in step 318. In step 319, SMF 305 may transmit Nsmf_PDUSessionUpdateSMContext Response acknowledging setup of the new PDU Session Anchor. An N2 path switch request acknowledgment may then be transmitted from AMF 304 to target RAN 303 in step 320. Once the acknowledgment is received by target RAN 303, downlink data may be received by UE 301 from new PDU session anchor 307, as shown in step 321. UE 301 may also transmit uplink data to new PDU session anchor 307 via target RAN 303.

In step 323, target RAN 303 may transmit a release resource command to source RAN 302. SMF 305 may then transmit a change request, such as an N4 anchor change request, to the old PDU session anchor, which may be source UPF 306, as shown in step 324. In step 325, the old PDU session anchor may send an N4 anchor change response. The N4 anchor change response, for example, may include UE MAC addresses of uplink packets received at source UPF 306. SMF 305 may then transmit a gratuitous ARP request, which may be in the form of an N4 message rather than a link layer ARP request, to new PDU session anchor 307, as shown in step 326. The ARP request may include the UE addresses received by SMF 305 in step 325.

In step 327, the new PDU session anchor, such as target UPF 307, may transmit a gratuitous ARP announcing to the network of the new PDU session anchor. The gratuitous ARP may update switch forwarding tables in the data network. In other words, the gratuitous ARP transmitted by the new PDU session anchor may update data network switches to forward packets to the new PDU session anchor. Steps 326 and 327, may be similar to steps 219 and 220 in FIG. 2 and steps 120 and 121 in FIG. 1. Step 327 may help to ensure that in the absence of an uplink packet from the user equipment, one or more downlink packets may be sent directly to the new PDU session anchor, such as target UPF 307.

As shown in step 328, any data that arrives from the network at the old PDU session anchor, such as source UPF 306, after SMF 305 has sent the anchor change request message, as shown in step 326, may be forwarded to the new PDU session anchor, such as target UPF 307. In step 329, the old PDU session anchor, such as source UPF 307, may transmit an end marker to target RAN 303 to indicate that no further downlink data may be sent on the old N3 tunnel. In step 330, the old PDU session anchor receives an N4 release request from SMF 305, and in step 331 the old PDU session anchor transmits an N4 release response acknowledging that the old PDU session anchor has been released to SMF 305. In the embodiments shown in FIG. 3, therefore, the old PDU session anchor may not be removed until after the new PDU session anchor has been established.

Figure 4:
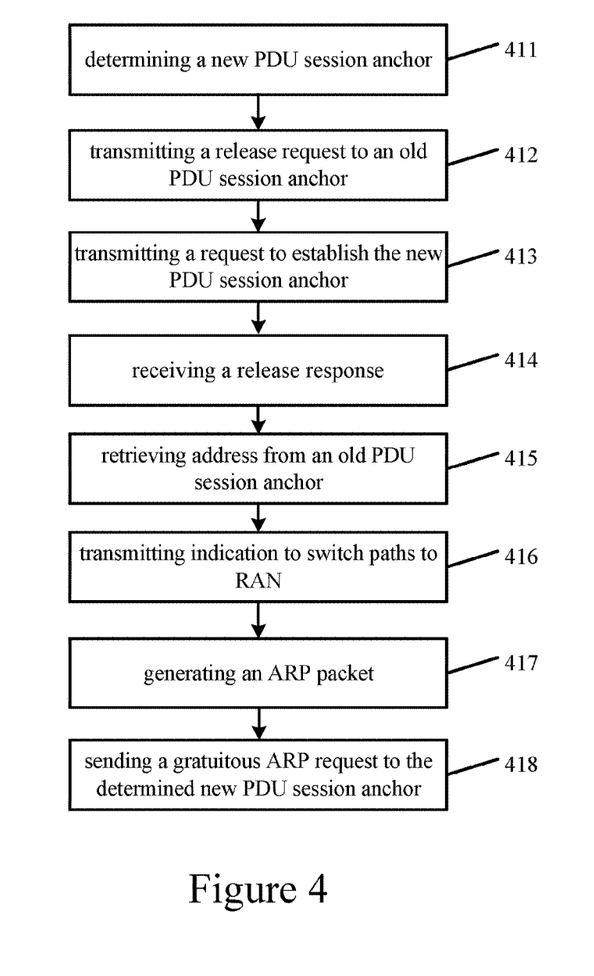
FIG. 4 illustrates an example of a flow diagram according to certain embodiments.

FIG. 4 illustrates an example of a flow diagram according to certain embodiments. In particular, FIG. 4 illustrates an example of a process or method performed by a network entity, such as the SMF shown in FIG. 1. In step 411, the network entity may determine a new PDU session anchor of a PDU session with a UE. The new PDU session anchor may be a UPF. The PDU session may be at least one of an Ethernet or an unstructured, type PDU session. In certain embodiments, the determining of the new PDU session anchor may be part of a session and service continuity mode 2 or a session and service continuity mode 3.

In step 412, the network entity may transmit a release request or an anchor change request to an old PDU session anchor before the sending of the gratuitous ARP request. In other embodiments, the release request or an anchor change request may be transmitted to the old PDU session anchor after the sending of the gratuitous ARP request. In step 413, the network entity, such as a SMF, may transmit to the new PDU session anchor, such as a UPF, a request to establish or a request to set up the new PDU session anchor. In certain embodiments, step 413 may occur before step 412, while in other embodiments step 413 may occur after step 412.

In step 414, the network entity may receive a release response in response to the release request or the anchor change request in response to the anchor change request. The release response may include the address of the UE in the PDU session. The address may be a MAC address. In some embodiments, the address of the UE in the PDU session may be included in a switching forwarding table. In certain embodiments, step 413 may occur before step 414, while in other embodiments step 413 may occur after step 414.

In step 415, the network entity may retrieve an address of the UE in the PDU session from an old PDU session anchor. In some embodiments, the address may be retrieved using the release response received in step 414. In step 416, the network entity may transmit an indication of the new PDU session anchor to the RAN. The indication may notify the RAN to switch paths to the new PDU session anchor. The paths, for example, may be paths through which Ethernet data and/or Unstructured Data received from the UE may be transmitted via the RAN to network entities. An embodiment of step 416 may be seen in steps 116, 117 in FIG. 1. In step 417, the network entity, such as the SMF, may generate an ARP packet. In certain embodiments, the ARP packet may be generated in the UPF instead of the SMF. In step 418, the network entity may send a gratuitous ARP request to the determined new PDU session anchor. The gratuitous ARP request may include an address of the UE in the PDU session. The gratuitous ARP request sent to the determined new PDU anchor session may include the address resolution protocol packet generated in step 417.

Figure 4A:
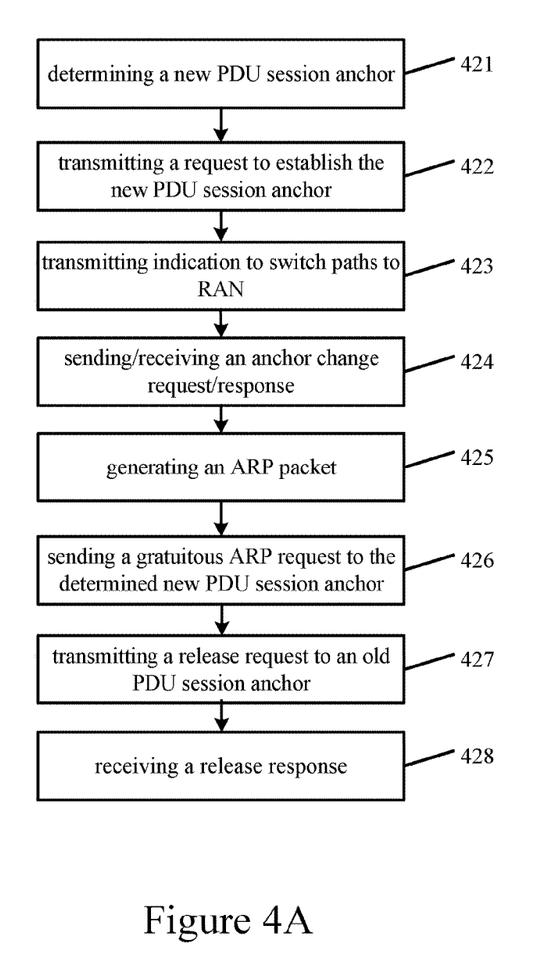
FIG. 4A illustrates an example of a flow diagram according to certain embodiments.

FIG. 4A illustrates an example of a flow diagram according to certain embodiments. In particular, FIG. 4 illustrates an example of a process or method performed by a network entity, such as the SMF shown in FIGS. 2 and 3. In step 421, the network entity may determine a new PDU session anchor of a PDU session with a UE. The new PDU session anchor may be a UPF. The PDU session may be at least one of an Ethernet or an unstructured, type PDU session. In certain embodiments, the determining of the new PDU session anchor may be part of a session and service continuity mode 2 or a session and service continuity mode 3.

In step 422, the network entity, such as a SMF, may transmit to the new PDU session anchor, such as a UPF, a request to establish or a request to set up the new PDU session anchor. In step 423, the network entity may transmit an indication of the new PDU session anchor to the RAN. The indication may notify the RAN to switch paths to the new PDU session anchor. The paths, for example, may be paths through which Ethernet data and/or Unstructured Data received from the UE may be transmitted via the RAN to network entities. An embodiment of step 423 may be seen in steps 214, 215 in FIG. 2.

In step 424, the network entity, such as the SMF, may transmit an anchor change request, which may be in the form of an N4 message, to the old PDU session anchor, such as a UPF. The network entity, such as the SMF, may then receive an anchor change response, which may also be in the form of an N4 message, from the old PDU session anchor. The anchor change request in step 424 may include the UE address, which may be received from the old PDU session anchor. In step 425, the network entity, such as the SMF, may generate an ARP packet. In certain embodiments, the ARP packet may be generated in the UPF instead of the SMF. In step 426, the network entity may send a gratuitous ARP request to the determined new PDU session anchor. The gratuitous ARP request may include an address of the UE in the PDU session. The gratuitous ARP request sent to the determined new PDU anchor session may include the address resolution protocol packet.

In step 427, the network entity may transmit a release request to an old PDU session anchor. The release request may be transmitted after the sending of the gratuitous ARP request. In step 428, the network entity may receive a release response in response to the release request.

Figure 5:
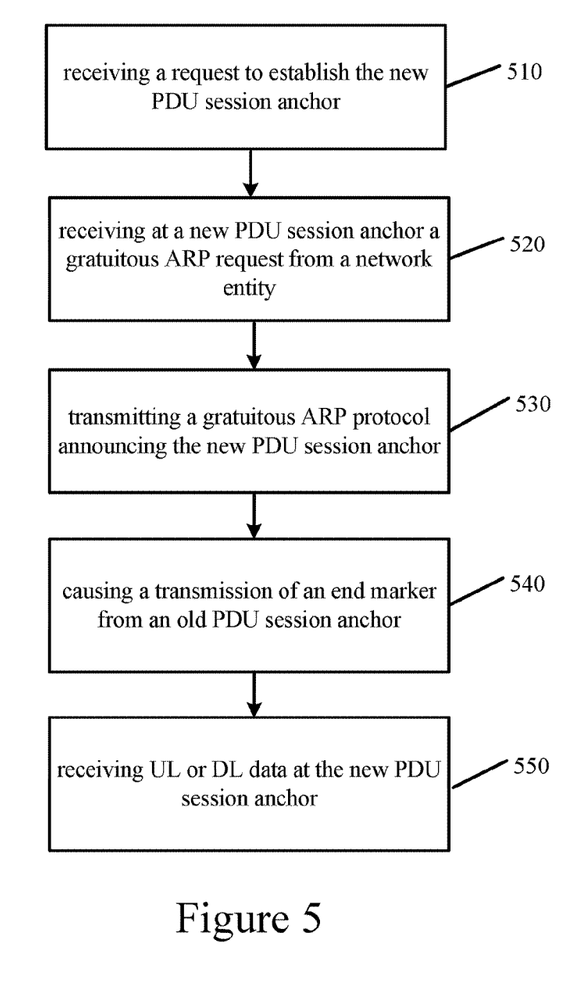
FIG. 5 illustrates an example of a flow diagram according to certain embodiments.

FIG. 5 illustrates an example of a flow diagram according to certain embodiments. In particular, FIG. 5 illustrates an example of a process or method performed by a new PDU session anchor, such as the UPF shown in FIGS. 1, 2, and 3. In step 510, the new PDU session anchor, such as the UPF, may receive a request from the network entity, such as the SMF, to establish the new PDU session anchor. In step 520, the new PDU session anchor of a PDU session with a UE may receive a gratuitous ARP request from a network entity, such as an SMF. The gratuitous ARP request may include an address of the user equipment. The address of the UE in the PDU session may be included in a switching forwarding table. The PDU session may be at least one of an Ethernet or an unstructured type PDU session. In certain embodiments, the gratuitous ARP request may be in the form of an ARP packet. In other embodiments, the ARP packet may be generated by the new PDU session anchor.

In step 530, the new PDU session anchor may transmit a gratuitous ARP announcing to a data network of the new protocol PDU anchor. The transmission of the gratuitous ARP may be either a broadcast or a unicast. The receiving of the gratuitous ARP request, in step 520, and/or the transmission of the gratuitous ARP, in step 530, may be part of a session and service continuity mode 2 or a session and service continuity mode 3. The gratuitous ARP transmitted by the new PDU session anchor updates data network switches to forward packets to the new PDU session anchor. In step 540, the reception of the gratuitous ARP or the Release Request sent to at the old PDU session anchor in 420 may cause the old PDU Session Anchor to transmit an end marker from an old PDU session anchor to the RAN. The end marker may indicate that no further data may be sent from the old PDU session anchor. In step 550, the new PDU session anchor may receive UL and/or downlink data at the new PDU session anchor from the UE or another network entity, such as the old PDU session anchor, via the data network.

Figure 6:
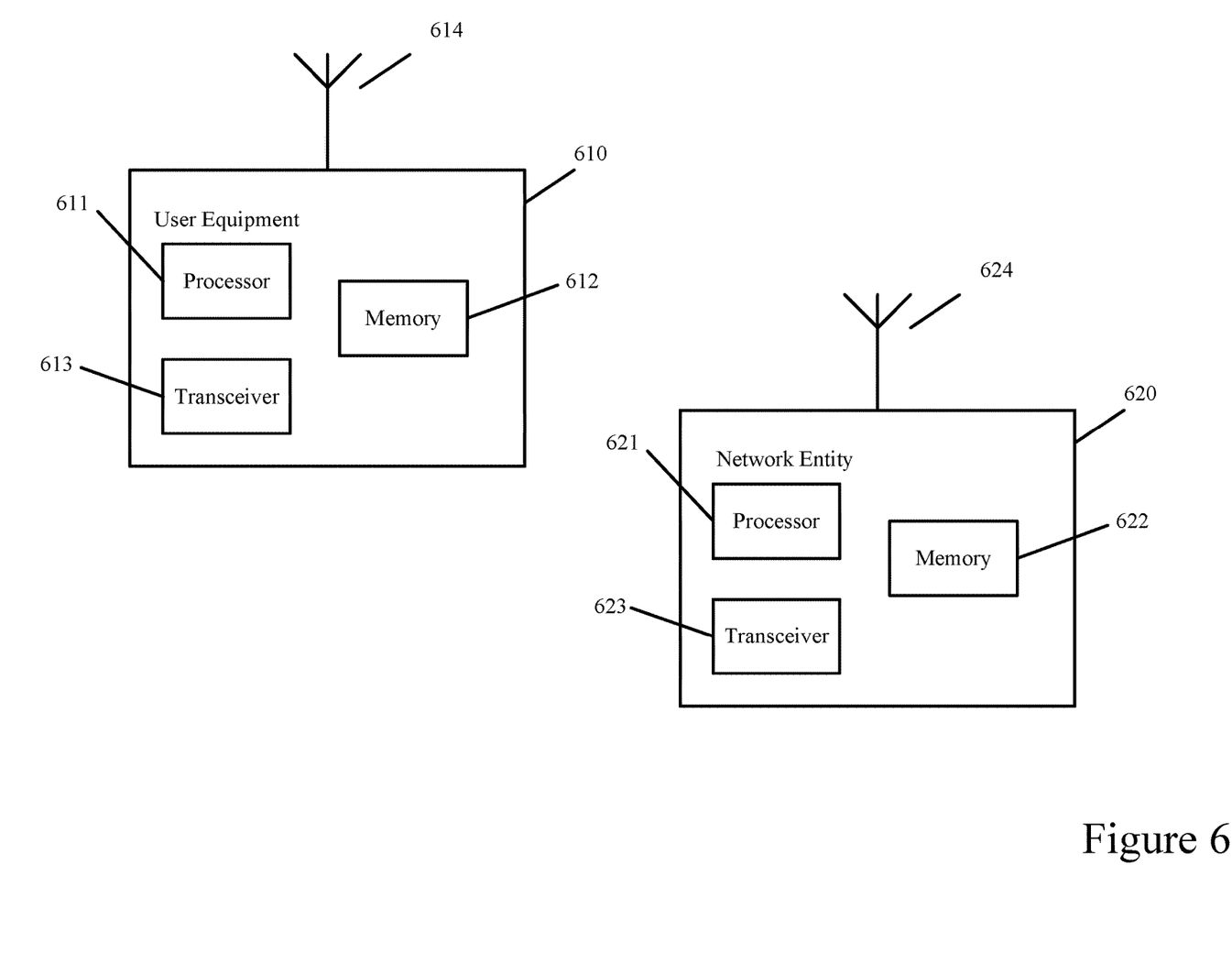
FIG. 6 illustrates an example of a system according to certain embodiments.

FIG. 6 illustrates a system according to certain embodiments. It should be understood that each block in FIGS. 1-5 may be implemented by various devices or technologies or their combinations, such as hardware, software, firmware, one or more processors and/or circuitry. In one embodiment, a system may include several devices, such as, for example, a network entity 620 or a UE 610. The system may include more than one UE 610 and more one network entity 620, although only one network entity is shown for the purposes of illustration. The network entity may be a network node, an access node, a base station, a eNB, a gNB, a server, a host, an AMF, a UPF, an SMF, or any of the other access or network node discussed herein.

Each of these devices may include at least one processor or control unit or module, respectively indicated as 611 and

621. At least one memory may be provided in each device, and indicated as 612 and 622, respectively. The memory may include computer program instructions or computer code contained therein. One or more transceiver 613 and 623 may be provided, and each device may also include an antenna, respectively illustrated as 614 and 624. Although only one antenna each is shown, many antennas and multiple antenna elements may be provided to each of the devices. Higher category UEs generally include multiple antenna panels. Other configurations of these devices, for example, may be provided. For example, network entity 620 and UE 610 may be additionally configured for wired communication, in addition to wireless communication, and in such a case antennas 614 and 624 may illustrate any form of communication hardware, without being limited to merely an antenna.

Transceivers 613 and 623 may each, independently, be a transmitter, a receiver, or both a transmitter and a receiver, or a unit or device that may be configured both for transmission and reception. In other embodiments, the network entity may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the UE may be a machine type communication (MTC) device, an eMTC UE, or an Internet of Things device, which may not require human interaction, such as a sensor, a meter, or an actuator.

In some embodiments, an apparatus, such as user equipment 610 or network entity 620, may include means for performing or carrying out embodiments described above in relation to FIGS. 1-5. In certain embodiments, the apparatus may include at least one memory including computer program code and at least one processor. The at least one memory including computer program code can be configured to, with the at least one processor, cause the apparatus at least to perform any of the processes described herein. The apparatus, for example, may be user equipment 610 or network entity 620.

Processors 611 and 621 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 620 or UE 610, to perform any of the processes described above (see, for example, FIGS. 1-5). Therefore, in certain embodiments, a non-transitory computer-readable medium may be encoded with computer instructions or one or more computer program (such as added or updated software routine, applet or macro) that, when executed in hardware, may perform a process such as one of the processes described herein. In other embodiments, a computer program product may encode instructions for performing any of the processes described above, or a computer program product embodied in a non-transitory computer-readable medium and encoding instructions that, when executed in hardware, perform any of the processes describes above. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1-5. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Specific examples of circuitry may be content coding circuitry, content decoding circuitry, processing circuitry, image generation circuitry, data analysis circuitry, or discrete circuitry. The term circuitry may also be, for example, a baseband integrated circuit or processor integrated circuit for a mobile device, a network entity, or a similar integrated circuit in server, a cellular network device, or other computing or network device.

Furthermore, although FIG. 6 illustrates a system including a network entity 620 and UE 610, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and a network entity, such as a relay node. The UE 610 may likewise be provided with a variety of configurations for communication other than communication network entity 620. For example, the UE 610 may be configured for device-to-device, machine-to-machine, and/or vehicle-to-vehicle transmission.

The above embodiments may provide for significant improvements to the functioning of a network and/or to the functioning of the user equipment and the network entities included within the network. Specifically, certain embodiments may help to change a PDU session anchor, for Ethernet PDU sessions or Unstructured Data sessions, in which the UE identifiers are not associated with the selected PDU session anchor. The changing of the PDU session anchor may be performed without having to signal the UE before the change, irrespective of the PDU session type. These embodiments create a more reliable and efficient signaling, which may help to reduce the amount of resources needed by the network for changing the PDU session anchor. In addition, because certain embodiments reduce signaling to the UE, the UE may utilize less network resources thereby reducing the battery usage of the UE.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

3GPP 3rd Generation Partnership Project
AMF Access Management Function
AN Access Network
APN Access Point Name
ARP Address Resolution Protocol
DL Downlink
DN Data Network
GTP GPRS Tunneling Protocol
MAC Media Access Control
MCC Mobile Country Code
MNC Mobile Network Code
NAS Non-Access Stratum
PDU Protocol Data Unit
RAN Radio Access Network
SSC Session and Service Continuity
SMF Session Management Function
TEID Tunnel Endpoint ID
UE User Equipment
UL Uplink
UP User Plane
UPF User Plane Function

We claim:

1. A method, comprising:
    determining at a session management function a new protocol data unit session anchor of a protocol data unit session with a user equipment;
    transmitting from the session management function to the new protocol data unit session anchor, via an interface, N4, used for transmitting communications between the session management function and the new protocol data unit session anchor, a request to establish the new protocol data unit session anchor;
    transmitting an indication from the session management function to a radio access network, wherein the indication notifies the radio access network to switch paths to the new protocol data unit session anchor;
    sending, via the N4 interface, from the session management function an N4 message to the determined new packet data unit session anchor after the transmitting of the request and the indication, wherein the N4 message comprises a media access control address of the user equipment in the protocol data unit session and wherein the N4 message comprises a trigger for transmission of a gratuitous address resolution protocol packet indicating the media access control address; and
    sending, in response to the N4 message, from the new packet data unit session anchor a gratuitous address resolution protocol packet comprising the media access control address for the user equipment.

2. The method according to claim 1, further comprising:
    at the session management function, retrieving the media access control address of the user equipment in the protocol data unit session from an old protocol data unit session anchor.

3. The method according to claim 1, wherein the protocol data unit session is at least one of an Ethernet and an unstructured type protocol data unit session.

4. The method according to claim 1, wherein the determining of the new protocol data unit session anchor is part of a session and service continuity mode 2 configured to allow the user equipment to support only a single protocol data unit session anchor at a time for the protocol data unit session or a session and fifth generation service continuity mode 3 configured allow establishment of a connection through the new protocol data unit session anchor before a previous connection to an old protocol data unit session anchor is terminated.

5. The method according to claim 1, further comprising:
    generating at the session management function the gratuitous address resolution protocol packet, wherein the N4 message sent to the determined new protocol data unit anchor session includes the gratuitous address resolution protocol packet.

6. The method according to claim 1, wherein the new protocol data unit session anchor is a user plane function.

7. The method according to claim 1, further comprising:
    at the session management function, transmitting a release request or an anchor change request to an old protocol data unit session anchor before or after the sending of the N4 message.

8. The method according to claim 7, further comprising:
    at the session management function, receiving a release response in response to the release request or an anchor change response in response to the anchor change request, wherein the response comprises the media access control address of the user equipment in the protocol data unit session.

9. The method according to claim 1, wherein the media access control address of the user equipment in the protocol data unit session is included in a switching forwarding table.

10. A method, comprising:
receiving at a new protocol data unit session anchor of a protocol data unit session with a user equipment, from a session management function via an interface, N4, used for transmitting communications between the session management function and the new protocol data unit session anchor, an N4 message, wherein the N4 message comprises a media access control address of the user equipment and wherein the N4 message comprises a trigger for transmission of a gratuitous address resolution protocol packet indicating the media access control address;
sending, in response to the N4 message, from the new protocol data unit session anchor a gratuitous address resolution protocol packet comprising the media access control address of the user equipment and announcing to a data network of the new protocol data unit session anchor; and
receiving at least one of uplink data at the new protocol data unit session anchor from the user equipment or downlink data via the data network.

11. The method according to claim 10, further comprising:
receiving at the new protocol data unit session a request from the session management function to establish the new protocol data unit session anchor.

12. The method according to claim 10, further comprising:
causing a transmission of an end marker from an old protocol data unit session anchor to the data network, wherein the end marker indicates that no further data will be sent from the old protocol data unit session anchor.

13. The method according to claim 10, wherein the sending of the gratuitous address resolution protocol packet is a broadcast or a unicast.

14. The method according to claim 10, wherein the protocol data unit session is at least one of an Ethernet and an unstructured type protocol data unit session.

15. The method according to claim 10, wherein the receiving of the N4 message is part of a session and service continuity mode 2 configured to allow the user equipment to support only a single protocol data unit session anchor at a time for the protocol data unit session or a session and fifth generation service continuity mode 3 configured allow establishment of a connection through the new protocol data unit session anchor before a previous connection to an old protocol data unit session anchor is terminated.

16. The method according to claim 10, wherein the new protocol data unit session anchor is a user plane function.

17. The method according to claim 10, wherein the media access control address of the user equipment in the protocol data unit session is included in a switching forwarding table.

18. The method according to claim 10, wherein the gratuitous address resolution protocol packet sent by the new protocol data unit session anchor updates data network switches to forward packets to the new protocol data unit session anchor.

19. A system, comprising:
a determining function configured to determine a new protocol data unit session anchor of a protocol data unit session with a user equipment;
a first transmitting function configured to transmit, to the new protocol data unit session anchor, via an interface, N4, used for transmitting communications between the session management function and the new protocol data unit session anchor, a request to establish the new protocol data unit session anchor;
a second transmitting function configured to transmit an indication to a radio access network, wherein the indication notifies the radio access network to switch paths to the new protocol data unit session anchor;
a first sending function configured to send, via the N4 interface, an N4 message to the determined new packet data unit session anchor after the transmitting of the request and the indication, wherein the N4 message comprises a media access control address of the user equipment in the protocol data unit session and wherein the N4 message comprises a trigger for transmission of a gratuitous address resolution protocol packet indicating the media access control address; and
a second sending function configured to send, in response to the N4 message, from the new packet data unit session anchor, a gratuitous address resolution protocol packet comprising the media access control address for the user equipment.

20. An apparatus, comprising:
at least one processor;
at least one memory comprising computer program code;
wherein the at least one memory and the computer program code are configured, with the at least one processor, to cause the apparatus at least to:
receive, from a session management function via an interface, N4, used for transmitting communications between the session management function and the apparatus, an N4 message, wherein the N4 message comprises a media access control address of a user equipment and wherein the N4 message comprises a trigger for transmission of a gratuitous address resolution protocol packet indicating the media access control address;
send, in response to the N4 message, a gratuitous address resolution protocol packet comprising the media access control address of the user equipment and announcing to a data network of the apparatus; and
receive at least one of uplink data from the user equipment or downlink data via the data network.

\* \* \* \* \*